Oct. 9, 1934.　　G. J. McINTOSH ET AL　　1,976,353

PORTABLE REFRIGERATED TRAY

Original Filed Dec. 16, 1932

Louis H. Caldwell
&
Gordon J. McIntosh
INVENTORS

BY *C. A. Harpman*
ATTORNEY

Patented Oct. 9, 1934

1,976,353

UNITED STATES PATENT OFFICE 1,976,353

PORTABLE REFRIGERATED TRAY

Gordon J. McIntosh and Louis H. Caldwell, Youngstown, Ohio

Application December 16, 1932, Serial No. 647,570
Renewed August 24, 1934

2 Claims. (Cl. 62—91.5)

This invention relates to portable refrigerated trays, and more particularly to a portable refrigerated tray which may be used to serve cold drinks in paper cups or other chilled drinks or ice creams, frozen confections and the like.

It is known that trays have been made that have been used to carry soft drinks in bottles and the like and have been cooled with ice. This was always an undesirable way of carrying the drinks as the ice water frequently spilled over and the results were not satisfactory due to an incompletely cooled drink or melted ice cream and the accompanying unsanitary appearance.

Our invention has to do with a tray of this type but one which is different and novel in the manner of cooling its contents and in being sanitary and clean to handle.

In our invention we provide a tray that is cooled with solid carbon dioxide, commonly known as dry ice, or any like cooling agent and in which the confection to be cooled is never in direct contact with the cooling agent.

Our invention has numerous good points which make a device of this kind attractive and valuable.

With the foregoing and other objects in view which will appear as the description proceeds, the invention resides in the combination and arrangement of parts and in the details of construction hereinafter described and claimed, it being understood that changes in the precise embodiment of the invention, can be made within the scope of what is claimed, without departing from the spirit of the invention.

The invention is illustrated in the accompanying drawing, wherein:—

Figure 1:
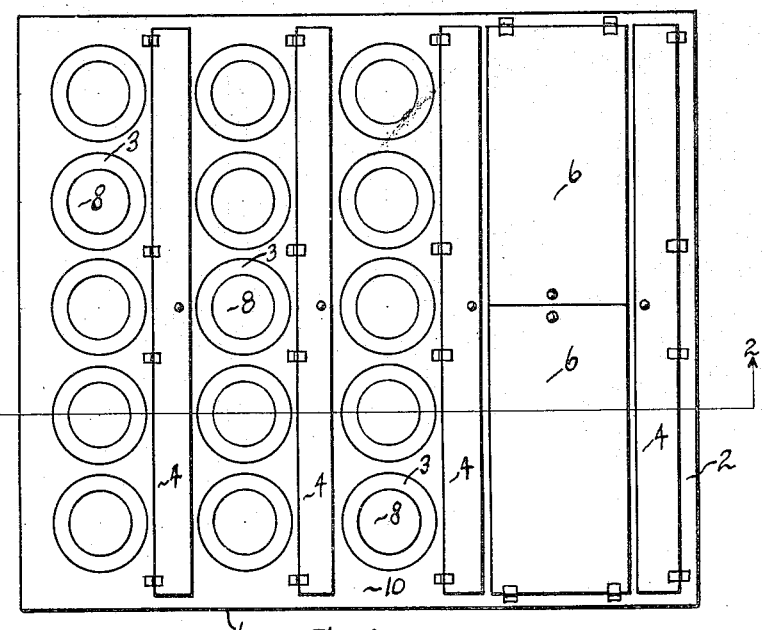
Figure 1 is a top plan view of our invention.
Figure 2:
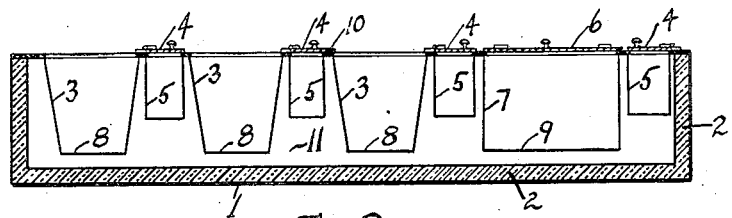
Figure 2 is a view of a cross section taken on line 2—2 of Figure 1 showing details found in Figure 1.

Number 1 is a tray made of any suitable material, preferably metal or wood, with bottom and side walls 2 formed with insulated material.

Mounted in a top 10 of said tray there is a plurality of cups 3 spaced apart and in oppositely disposed rows, in which the paper cups of drinks or frozen confections or ice creams are placed. Numbers 4 are hinged covers placed over baskets 5 or other suitable containers. Numbers 6 indicate hinged covers placed over a compartment 7.

In serving soft drinks or the like or frozen confections or ice creams at games or outings it is desirable that the drink or confection be served to the purchaser as attractively as possible.

Our invention provides for a very attractive service by providing a tray with a closed-in compartment for the cooling agent.

The tray 1 is provided with insulated bottom and sides 2 for the purpose of keeping out the warm air and keeping in the cold. This tray 1 is provided with the plurality of cups 3 which have bottoms 8. This makes a completely tight cooling chamber 11 for the cooling agent. It is in these cups 3 that the paper cups of drinks or confections are placed to be kept cool while being served. The tray 1 is provided with the compartment 7 that has a bottom 9 for the purpose of holding and cooling other things such as frozen confections. The tray 1 is provided with these baskets or suitable containers 5 for the purpose of holding the cooling agent. It will be seen that these containers 5 are placed near the top 10 of the inside of the tray so as to allow the cooling vapors from the cooling agent to flow down around the sides and bottoms of the cups 3 and the compartment 7 and into the chamber 11.

It will be seen that the containers 5 have been provided with hinged covers 4 for the purpose of keeping the containers closed off from the outside air and also for the purpose of allowing for the refilling of the containers with the cooling agent.

It will be understood that these containers 5 are preferably formed of perforated fiber or wire mesh or the like so that the cooling agent will have a relatively small surface contact with the containers. It is desirable that the cooling agent have a relatively small surface contact so that the cooling agent will last longer.

It is obvious that the degree of cold desired in the tray may be varied to suit different types of drinks or confections or to speed or retard the cooling process by using more or less of the cooling agent.

In operation our invention is as follows:

Solid carbon dioxide or other suitable cooling agent is placed in the containers 5, and the cups 3 are filled with drinks or the like and the compartment 7 is filled with other confections. The cooling agent, in subliming, gives off cool vapors which pass down and around the bases of the cups 3, the compartment 7, and into the chamber 11, thus cooling the contents quickly and effectively without any unsanitary appearance and the cooling agent produces such a degree of cold that the contents may be rapidly replaced and removed for sale, as the cooling is quick and complete.

What we claim is:—

1. In a device of the class described, a portable refrigerated tray, suitable insulation in said tray, a top for said tray, cups formed in said top, a compartment in said tray, covers for said compartment, wire mesh containers for a cooling agent suspended from top of said tray, covers for said wire mesh containers, substantially as described.

2. In a device of the class described, a portable refrigerated tray, suitable insulation in said tray, a top for said tray, cups formed in said top, a compartment in said tray, covers for said compartment, perforated fiber containers depended from top of said tray for the purpose of holding a cooling agent, covers for said perforated fiber containers, substantially as described.

GORDON J. McINTOSH.
LOUIS H. CALDWELL.